United States Patent
Lefevre et al.

(10) Patent No.: US 12,270,089 B2
(45) Date of Patent: Apr. 8, 2025

(54) METHOD FOR EXTRACTING A REFRACTORY METAL FROM AN ORE, A CONCENTRATE OR A WASTE PRODUCT

(71) Applicants: PARIS SCIENCES ET LETTRES, Paris (FR); ECOLE NATIONALE SUPERIEURE DE CHIMIE DE PARIS, Paris (FR); CENTRE NATIONAL DE LA RECHERCHE SCIENTIFIQUE, Paris (FR)

(72) Inventors: Grégory Lefevre, Sainte-Geneviève-des-Bois (FR); Thomas Degabriel, Sannois (FR)

(73) Assignees: PARIS SCIENCES ET LETTRES, Paris (FR); ECOLE NATIONALE SUPERIEURE DE CHIMIE DE PARIS, Paris (FR)

(*) Notice: Subject to any disclaimer, the term of this patent is extended or adjusted under 35 U.S.C. 154(b) by 429 days.

(21) Appl. No.: 17/628,507

(22) PCT Filed: Jul. 22, 2020

(86) PCT No.: PCT/FR2020/051326
§ 371 (c)(1),
(2) Date: Jan. 19, 2022

(87) PCT Pub. No.: WO2021/014095
PCT Pub. Date: Jan. 28, 2021

(65) Prior Publication Data
US 2022/0364205 A1  Nov. 17, 2022

(30) Foreign Application Priority Data
Jul. 25, 2019 (FR) ........................... 1908467

(51) Int. Cl.
C22B 34/36 (2006.01)
C22B 3/42 (2006.01)
(Continued)

(52) U.S. Cl.
CPC ............. *C22B 34/36* (2013.01); *C22B 3/42* (2013.01); *C22B 7/006* (2013.01); *C22B 34/22* (2013.01); *C22B 34/24* (2013.01); *C22B 34/34* (2013.01)

(58) Field of Classification Search
CPC .. C22B 1/02; C22B 3/42; C22B 34/22; C22B 34/24; C22B 34/34; C22B 34/36; C22B 7/006
See application file for complete search history.

(56) References Cited

U.S. PATENT DOCUMENTS

2017/0306440 A1   10/2017  Hein et al.
2018/0119252 A1*   5/2018  Douglas .................. C02F 1/42

OTHER PUBLICATIONS

Kholmogorov, A.G. et al. "Processing mineral raw materials in Siberia: ores of molybdenum, tungsten, lead, and gold." 2005. Hydrometallurgy. 76. p. 37-54. (Year: 2005).*
(Continued)

*Primary Examiner* — Nicholas A Wang
(74) *Attorney, Agent, or Firm* — IPSILON USA, LLP

(57) ABSTRACT

The present invention relates to a method for extracting a refractory metal selected from Nb, Ta, Mo, W and V, from a solid material comprising the refractory metal in an oxidised form, the method using a layered double hydroxide, and the use of a layered double hydroxide for extracting or purifying a refractory metal selected from Nb, Ta, Mo, W and V.

17 Claims, 1 Drawing Sheet

(51) Int. Cl.
*C22B 7/00* (2006.01)
*C22B 34/22* (2006.01)
*C22B 34/24* (2006.01)
*C22B 34/34* (2006.01)

(56) References Cited

OTHER PUBLICATIONS

Nguyen, T. et al. "A review on the separation of molybdenum, tungsten, and vanadium from leach liquors of diverse resources by solvent extraction." 2016. Geosystem Engineering. 19:5. p. 247-259. (Year: 2016).*
Hu, C. et al. "Polyoxometalate complexes of layered double hydroxides." 2004. Clay surfaces: fundamentals and applications. (Year: 2004).*
Jankovic, A. "Variables affecting the fine gridning of minerals using stirred mills." 2003. Minerals engineering. 16. p. 337-345. (Year: 2003).*
Hur, H., &Reeder, R.J. (2018). Formation of CoAl layered double hydroxide on the boehmite surface and its role in tungstate sorption, Journal of Environmental Sciences, 65, 103-115.
Gregory Lefevre et al. "Extraction of tungsten as polyoxometalate anion using a layered double hydroxide: Selectivity and regeneration" Separation Science and Technology, US, vol. 54, No. 4, Mar. 4, 2019 (Mar. 4, 2019).
International Search Report dated Sep. 28, 2020.
International Search Report 2 dated Sep. 28, 2020.

* cited by examiner

METHOD FOR EXTRACTING A REFRACTORY METAL FROM AN ORE, A CONCENTRATE OR A WASTE PRODUCT

RELATED APPLICATION

This application is a National Phase of PCT/FR2020/051326 filed on Jul. 22, 2020. which claims the benefit of priority from French Patent Application No. 19 08467, filed on Jul. 25, 2019, the entirety of which are incorporated by reference.

FIELD OF THE INVENTION

The present invention relates to a method for extracting a refractory metal selected from Nb, Ta, Mo, W and V from a solid material comprising said refractory metal in an oxidized form, said method employing a layered double hydroxide, and the use of a layered double hydroxide for extracting or purifying a refractory metal selected from Nb, Ta, Mo, W and V.

DESCRIPTION OF RELATED ART

Refractory metals such as vanadium, tantalum, tungsten, and niobium are classed by the European Commission as being critical materials (with molybdenum in turn being close to the limit), owing in particular to their low worldwide availability, possible causes of which include the concentration of production, the low recycling rate, and/or the reduced possibilities for substitution. These metals, however, are increasingly being used in a variety of applications such as electronics (integrated circuits, miniaturized capacitors, sputtering targets), metallurgy (manufacture of high-performance metal alloys and superalloys, manufacture of cutting tools), catalysis, aeronautics or aerospace, military applications (munitions, armor plating, countermeasure weights), the energy field (bulbs, batteries, electrodes), and/or the medical field (orthopedics, pacemakers, dental implants). With regard to the recycling rate, only 20% of the waste electrical and electronic equipment (WEEE) in France is recycled, yet could form an untapped resource deposit of said refractory metals.

The extraction of tungsten from an ore comprising an oxidized form of tungsten currently relies on the dissolution of the tungsten (also called leaching) by alkaline melting. Hence it entails treating the ore in an autoclave with sodium hydroxide or sodium carbonate at temperatures of between 100° C. and 200° C., with pressure rises which may range from 5 to 20 bar over a number of hours. This leaching step is followed by numerous purification steps (filtration, precipitation, ion exchange, crystallization) and by a step of calcining to form tungsten trioxide.

The extraction of tantalum from an ore or from waste electrical and electronic equipment comprising an oxidized form of tungsten is carried out by two distinct industrial methods. A first method (the "precipitation" method) comprises a step of dissolving a concentrated tantalum ore (coltan) in hydrofluoric acid, followed by a number of precipitation steps to form potassium heptafluorotantalate, by a further step of dissolution in hydrofluoric acid, followed by a number of steps of crystallization and by a heat treatment to form a tantalum oxide powder. A second method (the "solvent extraction" method) comprises a step of dissolving a concentrated tantalum ore (coltan) or a tantalum-concentrated WEEE in a mixture of hydrofluoric acid and sulfuric acid, followed by a number of steps of solvent extraction (with a kerosene solvent, for example), by a number of steps of precipitation in the presence of aqueous ammonia and potassium chloride, followed by a heat treatment to form a tantalum oxide powder. Other extraction methods have been recently proposed, such as that described in International application WO 2015/004375, which replaces the hydrofluoric acid attack with a heated concentrated alkaline attack. This method thus comprises the sodium conversion of an ore or concentrate of niobium and/or tantalum by addition of a concentrated NaOH solution at a temperature of between 50° C. and 150° C., the solid/liquid separation and recovery of the solid obtained in the preceding step, the washing of the solid recovered in the preceding step with an aqueous solution containing not more than 30 g/L of NaOH and recovery of the washed solid, the addition of water to dissolve the niobium and/or tantalum, solid/liquid separation and recovery of the aqueous solution containing niobium and/or tantalum as obtained in the preceding step, the acidification of the aqueous solution obtained in the preceding step to a pH of between 1 and 5, to precipitate the niobium and/or tantalum, and the solid/liquid separation and recovery of the purified niobium and/or tantalum precipitate obtained in the preceding step.

In ores or waste products, refractory metals are generally associated with numerous other elements, so making them slow and laborious to selectively extract. The methods for extracting refractory metals from ores or recycling wastes in the prior art therefore entail numerous operations of purification (elimination, filtration, crystallization, precipitation, solvent extraction, etc.), are expensive and/or are not selective. Lastly, the methods which are generally used produce a large number of effluents, employ polluting and/or organic solvents, and/or use drastic reaction conditions (strong acids, strong bases, high temperatures and/or high pressures, etc.), which may degrade the equipment and/or lead to safety, environmental, and health problems.

OBJECTS AND SUMMARY

It is therefore the aim of the present invention to provide a method for extracting refractory metals from an ore or from a recycling waste that is simple, economical, selective, which employs gentle reaction conditions, and which avoids the use of toxic and/or aggressive reactants and/or solvents.

A first subject of the invention is a method for extracting a refractory metal M selected from Nb, Ta, Mo, W, V, and a mixture of at least two of said refractory metals, from a solid material comprising said refractory metal in an oxidized form, characterized in that it comprises at least the following steps:

i) a step of contacting said solid material with a first aqueous composition comprising a first layered double hydroxide which is insoluble in said first aqueous composition, said first layered double hydroxide containing interlayer anions $A1^{n-}$, n being a positive integer, to form polyoxometallates of said refractory metal which are soluble in said first aqueous composition, said polyoxometallates having a negative charge $q^-$ such that q is a positive integer and q>n, ii) a first step of ion exchange in said first aqueous composition of said interlayer anions $A^{n-}$ with said polyoxometallates from step i), to form a second layered double hydroxide which is insoluble in said first aqueous composition, and iii) a second step of ion exchange of said polyoxometallates with anions $A2^{p-}$ in a second aqueous composition comprising said anions $A2^{p-}$, p being a positive integer, to form monomeric species of said refractory metal which are soluble in said second aqueous composition, said monomeric species having a negative charge m⁻ such that m is a positive integer and m≤p.

The method of the invention is simple, easy to implement, economical, and enables selective extraction of tungsten, niobium, tantalum, molybdenum or vanadium. Moreover, said method employs gentle reaction conditions and avoids the use of toxic and/or aggressive reactants and/or solvents. In particular, the use of a layered double hydroxide allows one or more oxidized forms of said refractory metal present in the solid material to be dissolved in an aqueous composition [step i)]. Furthermore, the ion exchange steps ii) and iii) ensure selective extraction of said refractory metal. Lastly, the method is sparing with natural resources, reduces the environmental impact caused by mining activity, and minimizes the impact of the production of materials necessary for the manufacture of electronic equipment.

Step i)

Step i) of the method of the invention employs a first layered double hydroxide which allows the refractory metal of the solid material to be leached or solubilized in the first aqueous composition.

Step i) is therefore a leaching step. In other words, step i) corresponds to the operation of extracting a substance (refractory metal) from a solid material by dissolving the substance in a liquid. By virtue of step i), and especially of the first layered double hydroxide, said refractory metal in an oxidized form in the solid material is placed in solution or dissolved in the first aqueous composition in the form of polyoxometallates, thereby allowing it to be extracted from said solid material. The polyoxometallates are soluble in the first aqueous composition and have a negative charge q− such that q is a positive integer and q>n. In other words, the oxidized form of the refractory metal that is present in said solid material is not soluble in the first aqueous composition.

In the present invention, the expression "insoluble" material (e.g., refractory metal in an oxidized form) in a liquid (e.g., first aqueous composition) means that the dissolution of said material in said liquid is very slow, and that a solubility of less than about 1% (i.e., less than one gram of said material is soluble per 100 g of material dispersed in said liquid) is obtained after 24 hours of equilibrium. The solubility of said material may be determined by techniques well known to the skilled person, especially by inductively coupled plasma spectrometry.

According to one preferred embodiment, the charge q of the polyoxometallates is such that: 2≤q≤10, and more preferably 4≤q≤6.

The polyoxometallates are defined as polyatomic anions containing preferably at least 3 oxyanions of said refractory metal, connected to one another by common oxygen atoms.

The polyoxometallates may conform to the formula below:

$[M_uO_zH_y]^{q-}$ in which:
M is selected from Nb, Ta, Mo, W, and V,
q is as defined in the invention,
u is a positive integer such that u≥3, and preferably 4≤u≤7, and
z is a positive integer such that z≥19, and preferably 19≤z≤24, and
y is a positive integer such that 0≤y≤3.

The Solid Material

The solid material may be an ore, a concentrate, or a ground material (also called homogenate, shred or shredded material) resulting from waste electrical or electronic equipment.

When the metal M is tungsten, the solid material may be scheelite, preferably concentrated, wolframite, preferably concentrated, or a tungsten-containing waste product.

When the metal M is tantalum, the solid material may be an ore from the columbite-tantalite series (microlite, stuverite, stibiotantalite, wodgnite), preferably concentrated, a tin slag, or waste electrical and electronic equipment (WEEEs).

When the metal M is molybdenum, the solid material may be a non-copper-bearing porphyrin ore containing molybdenite alone, a copper-bearing porphyry, or a quartz monzonite porphyry.

When the metal M is vanadium, the solid material may be a vanadate ore or a hydrated natural oxide.

When the metal M is niobium, the solid material may be a columbite-tantalite ore, a pyrochlore, a tin slag, or waste electrical and electronic equipment (WEEEs).

The mixture of at least two of said refractory metals; the mixture is preferably a mixture of Nb and Ta, or a mixture of at least two refractory metals selected from V, W, and Mo.

The solid material may comprise not only the refractory metal M but also at least one metal selected from Fe, Mn, Mg, Cu, Zn, Pb, Al, Ti, and Sn.

The solid material employed in step i) is preferably a material in the form of particles having an average size of less than about 20 μm.

Considering a plurality of particles of the solid material according to the invention, the term "average size" refers to the number-average size of the collective particles of a given population, this size being determined conventionally by methods well known to the skilled person.

The size of the one or more particles of the solid material according to the invention may be determined, for example, by microscopy, especially by scanning electron microscope (SEM) or by transmission electron microscope (TEM), by particle size analysis by sieving, by dynamic light scattering (DLS), or by laser diffraction.

The refractory metal in an oxidized form may represent at least about 0.1% by mass, preferably at least about 0.5% by mass, relative to the total mass of said solid material.

The refractory metal in an oxidized form may represent at most 100% by mass, preferably at most 90% by mass, relative to the total mass of the cations present in said solid material.

In the invention, the expression "in an oxidized form" in relation to the refractory metal contained in the solid starting material means that the refractory metal has a strictly positive oxidation state, preferably ranging from about +2 to +6.

The First Layered Double Hydroxide

The first layered double hydroxide employed in step i) is preferably a material in the form of particles having an average size of less than 20 μm, and with particular preference having an average size of from about 0.1 μm to 20 μm.

Considering a plurality of particles of the first layered double hydroxide according to the invention, the term "average size" refers to the number-average size of the collective particles of a given population, this size being determined conventionally by methods well known to the skilled person.

The size of the one or more particles of the first layered double hydroxide according to the invention may be determined, for example, by microscopy, especially by scanning electron microscope (SEM) or by transmission electron microscope (TEM), by particle size analysis by sieving, by dynamic light scattering (DLS), or by laser diffraction.

The first layered double hydroxide is a layered double hydroxide (also called LDH). Layered double hydroxides are a class of anionic clays. They possess two types of metal cations in the main layers and an anionic species in the interlayer regions.

Said first layered double hydroxide therefore contains interlayer anions identified as $A1^{n-}$, n being a positive integer. Preferably the charge n is such that: $1 \leq n \leq 4$, and more preferably $1 \leq n \leq 2$.

The interlayer anion A1 of the first layered double hydroxide may be selected from monovalent and divalent anions and selected from organic and inorganic anions.

Inorganic anions are preferred.

Inorganic anions may include carbonates, sulfates, nitrates, or halides such as chlorides or bromides.

Carbonate anions $CO_3^{2-}$ are preferred.

According to one preferred embodiment of the invention, the first layered double hydroxide is selected from layered double hydroxides conforming to the formula (I) below:
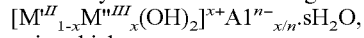
in which:
M$^{II}$ and M'$^{III}$ represent respectively divalent and trivalent metal cations,
A1 is an n-valent interlayer anion selected from monovalent and divalent anions and selected from organic and inorganic anions,
x, s, and n are positive numbers,
x corresponds to the molar fraction of M'$^{III}$/(M$^{II}$+M'$^{III}$), and $0<x<1$,
M$^{II}$ is selected from $Ca^{2+}$, $Mg^{2+}$, $Mn^{2+}$, $Fe^{2+}$, $Co^{2+}$, $Ni^{2+}$, $Cu^{2+}$, and $Zn^{2+}$, and
M'$^{III}$ is selected from $Al^{3+}$, $Mn^{3+}$, $Fe^{3+}$, $Co^{3+}$, and $Cr^{3+}$.

The anion A1 is preferably as defined in the invention.

n is preferably as defined in the invention.

The first layered double hydroxide is insoluble in the first aqueous composition.

x is preferably such that: $0.1<x<0.8$; and with particular preference $0.2 \leq x \leq 0.4$.

The first layered double hydroxide is preferably selected from hydrotalcite of formula $Mg_6Al_2CO_3(OH)_{16} \cdot 4H_2O$, and the compound of formula $Mg_6Fe_2(CO_3)_{1.76}(OH)_{14.7} \cdot 2H_2O$.

The First Aqueous Composition

In the invention, the expression "aqueous composition" refers to a composition comprising at least about 50% by volume of water, preferably at least about 80% by volume of water, with particular preference at least about 95% by volume of water, and with more particular preference about 100% by volume of water.

The first aqueous composition, when it does not comprise solely water as the solvent, may comprise one or more organic solvents, selected in particular from lower alcohols (i.e., $C_1$-$C_5$ alcohols) and from amines, especially primary, secondary, or tertiary amines.

The first aqueous composition may have a pH selected in a range of from about 3.5 to 12.5.

The pH of the first aqueous composition may be adjusted to the desired value:
either with an organic or inorganic acid, and preferably with an inorganic acid;
or with an inorganic base.

According to the invention, the inorganic acid may be hydrochloric acid, nitric acid, sulfuric acid, or phosphoric acid. Phosphoric acid is preferred.

The organic acid may be acetic acid.

The inorganic base may be a base such as NaOH, KOH, or $NH_3$.

In one embodiment, the concentration of solid matter in the first aqueous composition is from about 1 to 400 g/l, preferably from about 1 to 200 g/l, and with particular preference from about 1 to 100 g/l.

The solid matter is represented by the first layered double hydroxide and the solid material.

In one embodiment, the mass ratio of the mass of said solid material to the mass of the first layered double hydroxide in step i) is from 1 to 100, preferably from about 2 to 50, and with particular preference from about 4 to 25.

In step i), the solid material and the first layered double hydroxide are preferably in the form of an intimate mixture of solid particles dispersed in the first aqueous composition.

Step i) is preferably carried out at ambient temperature (e.g., about 18-25° C.).

Step i) is preferably carried out with stirring.

First Variant: Refractory Metal Selected from Nb and Ta

According to a first variant of the invention, M is selected from Nb, Ta, and a mixture thereof.

According to this first variant, step i) is carried out in a basic medium, preferably at a pH selected in a range of from about 10 to 12.5, and more preferably from about 11 to 12.5.

In one preferred embodiment of this first variant, step i) comprises the following substeps:
ia) an alkaline treatment of said solid material at a temperature of less than or equal to about 550° C., and
ib) the mixing of the treated material from substep ia) with the first layered double hydroxide in the first aqueous composition,
said first aqueous composition having a pH selected in a range of from 10 to 12.5, and preferably from about 11 to 12.5.

Substep ia) is an alkaline activation under gentle conditions which allow the formation of an intermediate solid material [also called treated material from substep ia)] comprising said refractory metal in an oxidized form, the oxidized form of said refractory metal not being soluble in the first aqueous composition.

The alkaline treatment of substep ia) may be carried out by contacting said solid material with an aqueous solution comprising at least one base, selected for example from NaOH and KOH.

The alkaline treatment of substep ia) may be carried out at a temperature of from about 315 to 500° C., and preferably from about 350 to 450° C.

Substep ia) is preferably carried out at atmospheric pressure.

Substep ia) may last for about 1 to 24 h, and preferably from about 2 to 10 h.

The concentration by mass of the base in the aqueous solution may be from about 0.001 to 10 g/L, and preferably from about 0.01 to 1 g/L.

The molar ratio [number of moles of base]/[number of moles of refractory metal of the first variant] may be from 1 to 5000, and preferably from about 1300 to 2500.

In one embodiment, the mass ratio of the mass of said intermediate solid material to the mass of the first layered double hydroxide in substep ib) is from about 4 to 20, and preferably from about 5 to 15.

In one embodiment, the concentration of solid matter in the first aqueous composition in substep ib) is from about 1 to 25 g/l, and preferably from about 1 to 10 g/l.

The solid matter is represented by the first layered double hydroxide and the intermediate solid material.

Second Variant: Refractory Metal Selected from W, Mo, and V

According to a second variant of the invention, M is selected from W, Mo, V, and a mixture of at least two of said metals.

According to this second variant, step i) is carried out in an acidic or basic medium, and more particularly at a pH selected in a range of from about 3.5 to 10.

In one preferred embodiment of this second variant, the first aqueous composition further comprises a compound capable of forming heteropolyanions selected from phosphates and silicates, the pH of the first aqueous composition being selected in a range of from 3.5 to 10. The compound which is capable of forming heteropolyanions thus allows step i), and possibly step ii), to be accelerated.

Examples of phosphates may include phosphoric acid $H_3PO_4$, or $KH_2PO_4$.

According to one particularly preferred embodiment of the invention, the compound is a phosphate, and advantageously phosphoric acid.

The compound capable of forming heteropolyanions may have a concentration in the first aqueous composition of from about 0.1 to 3 g/l, and preferably from about 0.3 to 0.9 g/l.

According to one preferred embodiment of the second variant, the pH is selected in a range of from about 3.5 to 7, and with more particular preference from about 3.5 to 5.

In one embodiment, the mass ratio of the mass of said solid material to the mass of the first layered double hydroxide in step i) is from about 4 to 20, and preferably from about 5 to 15.

In one embodiment, the concentration of solid matter in the first aqueous composition in step i) is from about 1 to 25 g/l, and preferably from about 1 to 10 g/l.

The solid matter is represented by the first layered double hydroxide and the solid material.

Step ii)

Step ii) is a first ion exchange step in said first aqueous composition of said interlayer anions $A^{n-}$ of the first layered double hydroxide with said polyoxometallates from step i), to form a second layered double hydroxide which is insoluble in said first aqueous composition.

In this step ii), the refractory metal M dissolved in the first aqueous composition in the form of polyoxometallates is capable of replacing the interlayer anions $A^{n-}$ present in the sheets of the first layered double hydroxide, to form a second layered double hydroxide. This step ii) may also be termed a step of sorption of said refractory metal M.

This ion exchange step is possible in particular because the negative charges n and q are such that n<q.

According to one particularly preferred embodiment of the invention, steps i) and ii) are concurrent. In other words, as soon as the polyoxometallates are formed in the first aqueous composition [step i)], they undergo exchange with the interlayer anions $A^{n-}$ [step ii)].

Step ii) may last from about 5 h to 72 h, and preferably from about 12 h to 36 h.

Step ii) is preferably carried out at ambient temperature (e.g., about 18-25° C.).

Step ii) is preferably carried out with stirring.

Step iii)

Step iii) is a second step of ion exchange of said polyoxometallates with anions $A2^{p-}$ in a second aqueous composition comprising said anions $A2^{p-}$, p being a positive integer, to form monomeric species of said refractory metal which are soluble in said second aqueous composition.

In other words, during step iii), the polyoxometallates will desorb from the second layered hydroxide in the form of monomeric species of said refractory metal which are soluble in the second aqueous composition, while the anions $A2^{p-}$ present in the second aqueous composition will replace the polyoxometallates present in the sheets of the second layered double hydroxide, to form a third layered hydroxide comprising anions $A2^{p-}$. This step iii) may also be termed a step of desorption of said refractory metal M.

This step iii) enables firstly the desorption of the refractory metal and secondly its selective dissolution. This step iii) also prevents precipitation of the refractory metal.

Step iii) is preferably carried out at ambient temperature (e.g., about 18-25° C.).

Step iii) may last from about 5 h to 72 h, and preferably from about 12 h to 36 h.

Step iii) is preferably carried out with stirring.

The second aqueous composition, when it does not comprise solely water as solvent, may comprise one or more organic solvents, selected in particular from lower alcohols (i.e., $C_1$-$C_5$ alcohols) and from amines, especially primary, secondary, or tertiary amines.

The second aqueous composition may have a pH selected in a range of from about 7 to 11.

According to the first variant as defined in the invention, the pH is preferably from 8.5 to 9.5.

According to the second variant as defined in the invention, the pH is preferably from 9 to 11.

The pH of the second aqueous composition may be adjusted to the desired value with an inorganic base. According to the invention, the inorganic base may be a base such as KOH or NaOH.

In one embodiment, the concentration of the second layered hydroxide in the second aqueous composition is from about 1 to 100 g/l, and preferably from about 1 to 10 g/l.

In one embodiment, the concentration of the anions $A2^{p-}$ in the second aqueous composition is from about 0.06 to 6 g/l, and preferably from about 0.06 to 0.6 g/l.

The anions $A2^{p-}$ used in step iii) may take the form of a metal salt, more particularly an alkali metal or alkaline earth metal salt.

According to one preferred embodiment of the invention, the charge of the anions $A2^{p-}$, p, is such that: 2≤p≤4, and more preferably p=2.

According to one preferred embodiment of the invention, the charge of the monomeric species of said refractory metal, m, is such that: 1≤m≤2, and more preferably m=2.

According to the first variant as defined in the invention, the second aqueous composition may further comprise at least one complexing agent. This may make it possible to facilitate the dissolution of the monomeric species of said refractory metal which are formed in the second aqueous composition in step iii), and possibly to facilitate the desorption of said refractory metal M.

The complexing agent may be selected from phosphates, peroxides, and one of the mixtures thereof. The complexing agent is preferably a peroxide or a mixture of a peroxide and a phosphate.

Examples of phosphates may include inorganic phosphates such as $KH_2PO_4$ or phosphoric acid.

Examples of peroxides may include inorganic peroxides such as $H_2O_2$, or organic peroxides such as hydroperoxides or dialkyl peroxides.

Inorganic peroxides, and especially $H_2O_2$, are preferred.

In one embodiment, the concentration of the complexing agent, or of the complexing agents when there are more than one, in the second aqueous composition is from about 0.01 to 10 g/l, and preferably from about 2.5 to 5 g/l.

According to one preferred embodiment of the invention, the complexing agents in the second aqueous composition comprise $KH_2PO_4$ and $H_2O_2$, in particular having respective concentrations of from about 0.05 to 0.4 g/l and about 1.25 to 5 g/l.

In step iii), the phosphate is preferably added before the addition of the peroxide to the second aqueous composition. This may make it possible to prevent the partial degradation of the peroxide, and so to prevent gaseous emissions (oxygen).

Other Steps

The method may further comprise, before step i), a step i0) of grinding of the solid material.

This therefore facilitates step i).

The method may further comprise, between steps ii) and iii), a step ii1) of solid/liquid separation, to recover the second layered double hydroxide in the form of a solid.

This step ii1) may be carried out using a filter press.

The second layered hydroxide thus obtained may be used directly in step iii), for example by prior preparation of a second aqueous composition comprising said second layered hydroxide and also the anions $A2^{p-}$.

The method may further comprise, after step iii), a step iv) of solid/liquid separation, to recover the monomeric species of said refractory metal in solution.

To do this, step iv) may be carried out by means of a filter press in order to remove the third layered hydroxide thus formed and, where appropriate, other solid species which are insoluble in the second aqueous composition.

The method may further comprise, after step iv), a step v) of precipitation of the refractory metal in the form of an oxide, from the monomeric species of said refractory metal in solution.

This step v) may be carried out by adding a salt such as an alkali metal halide to the solution, in particular an alkali metal chloride (e.g., KCl or NaCl), and a change in pH through addition of acid or base.

As soon as the refractory metal in the form of an oxide is precipitated, step v) may be followed by a step vi) of separation to obtain a precipitate, in particular by means of a filter press, followed by a step vii) of drying the precipitate, to form a metal oxide powder.

A second subject of the invention is the use of a layered double hydroxide containing interlayer anions $A1^{n-}$, n being a positive integer, for the extraction or purification of a refractory metal selected from Nb, Ta, Mo, W, V, and a mixture of at least two of said refractory metals, from a solid material comprising said refractory metal in an oxidized form.

The layered double hydroxide according to the second subject may be the first layered double hydroxide as defined in the first subject of the invention.

DETAILED DESCRIPTION

Example 1: Leaching of a Tungsten Oxide from a Pure Tungsten Oxide, Using Hydrotalcite of Formula $Mg_6Al_2CO_3(OH)_{16} \cdot 4H_2O$ as First Layered Hydroxide 46 mg of tungsten oxide sold under reference 101921593 by Sigma Aldrich, comprising about 79% by mass of tungsten, and 50 mg of hydrotalcite as first layered double hydroxide were dispersed in 20 ml of water to form a first aqueous composition. The pH of the composition was adjusted to 4.5 using 1M phosphoric acid.

The first aqueous composition was stirred at ambient temperature for 24 hours, to allow the leaching of the tungsten in the form of polyoxometallates and the sorption of said polyoxometallates within the hydrotalcite in place of the carbonate anions, to form a second layered hydroxide.

The first aqueous composition was filtered to recover the second layered hydroxide.

50 mg of the second layered hydroxide were dispersed in 20 ml of water to form a second aqueous composition containing a carbonate ion concentration of $10^{-2}$M. The pH of the composition was adjusted to 10 by addition of a 1M NaOH solution.

The second aqueous composition was stirred at ambient temperature for 24 hours, to allow the desorption of the polyoxometallates within the second layered hydroxide, and to form monomeric species of the tungsten in solution.

Figure 1:
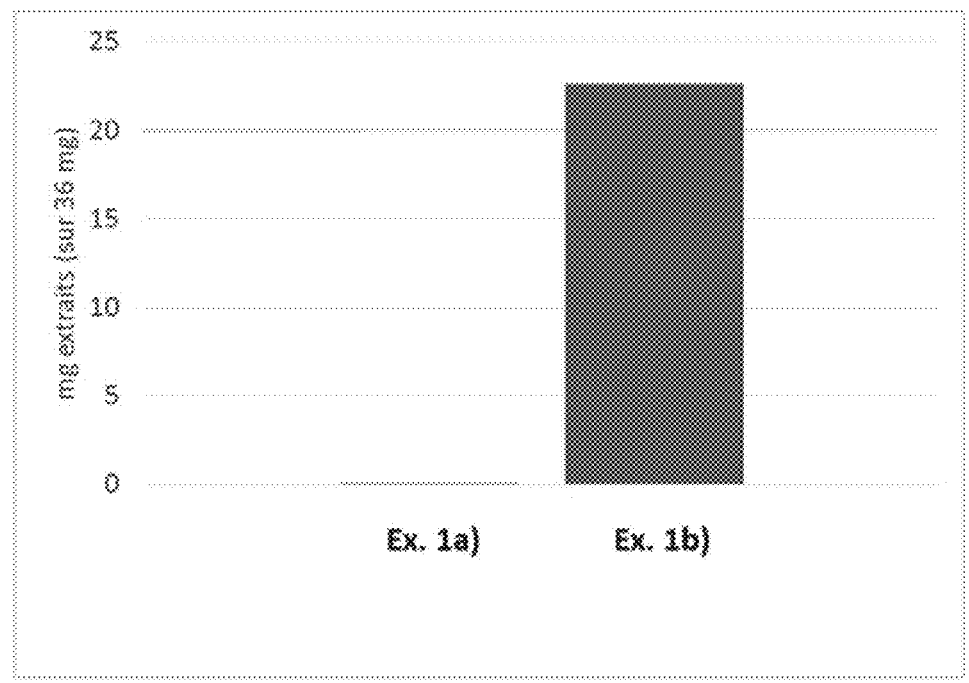
FIG. 1 represents a figure showing the performance of a layered double hydroxide used for extracting tungsten from a concentrated ore.

FIG. 1 [Ex. 1a) and Ex. 1b)] shows the tungsten extraction performance by the method as described in example 1 [Ex. 3b)], and, for comparison, the absence of extraction or negligible extraction of tungsten when the first aqueous composition does not comprise hydrotalcite [Ex. 3a)].

Example 2: Extraction of Tantalum from a Concentrated WEEE, Using the Compound of Formula $Mg_6Fe_2(CO_3)_{1.76}(OH)_{14.7} \cdot 7.2H_2O$ as First Layered Hydroxide 1.5 g of motherboard containing about 0.1 to 0.4% by mass of tantalum in an oxidized form, supplied by Terrallova Développement (TND), were mixed with 1.36 g of sodium hydroxide and the mixture was heated at 400° C. for 5 hours. The alkaline treatment carried out in this way produced an intermediate solid material, which was then ground.

575 mg of the intermediate solid material and 50 mg of a compound of formula $Mg_6Fe_2(CO_3)_{1.76}(OH)_{14.7} \cdot 7.2H_2O$ as first layered double hydroxide were dispersed in 50 ml of water to form a first aqueous composition. The pH of the composition was adjusted to 12 by addition of a concentrated NaOH solution.

The first aqueous composition was stirred at ambient temperature for 24 hours, to allow the leaching of the tantalum in the form of polyoxometallates and the sorption of said polyoxometallates within the first layered double hydroxide in place of the carbonate anions, to form a second layered hydroxide.

The first aqueous composition was filtered to recover the second layered hydroxide.

50 mg of the second layered hydroxide were dispersed in 25 ml of water to form a second aqueous composition containing a carbonate ion concentration of $10^{-2}$M. The pH of the composition was adjusted to 9 by addition of nitric acid. Then 6 mg of $KH_2PO_4$ were added, followed by 2.1 ml of a 30% by mass aqueous solution of $H_2O_2$.

The second aqueous composition was stirred at ambient temperature for 24 hours, to allow the desorption of the polyoxometallates within the second layered hydroxide and to form monomeric species of the tantalum in solution.

Figure 2:
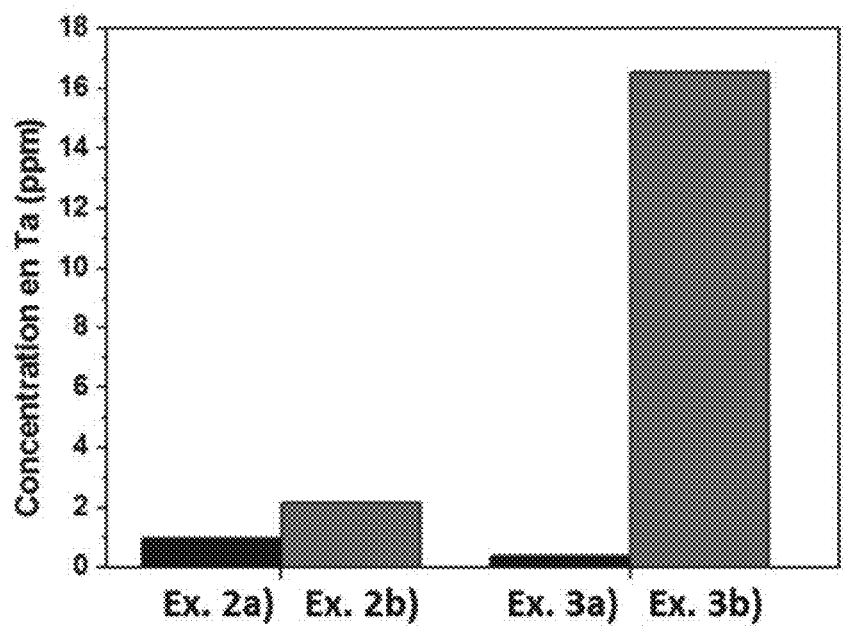
FIG. 2 represents a figure showing the performance of a layered double hydroxide used for extracting tantalum from a concentrated ore.

FIG. 2 [Ex. 2a) and Ex. 2b)] shows the tantalum extraction performance by the method as described in example 2 [Ex. 2b)], and, for comparison, the absence of extraction or low level of extraction of tantalum when the first aqueous composition does not comprise layered double hydroxide [Ex. 2a)].

Example 3: Extraction of Tantalum from a Concentrated Ore, Using the Compound of Formula $Mg_6Fe_2(CO_3)_{1.76}(OH)_{14.7} \cdot 7.2H_2O$ as First Layered Hydroxide 2.5 g of a concentrated ore (coltan) comprising about 5 to 20% by mass of tantalum in an oxidized form, supplied by Terrallova Développement (TND), were mixed with 1.36 g of sodium hydroxide and the mixture was heated at 400° C. for 5 hours. The alkaline treatment carried out in this way produced an intermediate solid material, which was then ground.

198 mg of the intermediate solid material and 25 mg of a compound of formula $Mg_6Fe_2(CO_3)_{1.76}(OH)_{14.7} \cdot 7.2H_2O$ as first layered double hydroxide were dispersed in 50 ml of water to form a first aqueous composition. The pH of the composition was adjusted to 12 by addition of a concentrated NaOH solution.

The first aqueous composition was stirred at ambient temperature for 24 hours, to allow the leaching of the tantalum in the form of polyoxometallates and the sorption of said polyoxometallates within the first layered double hydroxide in place of the carbonate anions, to form a second layered hydroxide.

The first aqueous composition was filtered to recover the second layered hydroxide.

25 mg of the second layered hydroxide were dispersed in 25 ml of a solution containing 0.06 mg of sodium carbonate to form a second aqueous composition. The pH of the composition was adjusted to 9 by addition of nitric acid. Then 6 mg of $KH_2PO_4$ were added, followed by 2.1 mL of 30% $H_2O_2$.

The second aqueous composition was stirred at ambient temperature for 24 hours, to allow the desorption of the polyoxometallates within the second layered hydroxide and to form monomeric species of the tantalum in solution.

FIG. 2 [Ex. 3a) and Ex. 3b)] shows the tantalum extraction performance by the method as described in example 3 [Ex. 3b)], and, for comparison, the absence of extraction or negligible extraction of tantalum when the first aqueous composition does not comprise layered double hydroxide [Ex. 3a)].

The invention claimed is:

1. A method for extracting a refractory metal M selected from Nb, Ta, Mo, W, V, or a mixture of at least two of said refractory metals, from a solid material comprising said refractory metal in an oxidized form, wherein said method comprises at least the following steps:
  i) a step of contacting said solid material with a first aqueous composition comprising a first layered double hydroxide which is insoluble in said first aqueous composition, said first layered double hydroxide containing interlayer anions A1n−, n being a positive integer, to form polyoxometallates of said refractory metal which are soluble in said first aqueous composition, said polyoxometallates having a negative charge q− such that q is a positive integer and q>n,
  ii) a first step of ion exchange in said first aqueous composition of said interlayer anions An—with said polyoxometallates from step i), to form a second layered double hydroxide which is insoluble in said first aqueous composition, and
  iii) a second step of ion exchange of said polyoxometallates with anions A2p− in a second aqueous composition comprising said anions A2p−, p being a positive integer, to form monomeric species of said refractory metal which are soluble in said second aqueous composition, said monomeric species having a negative charge m− such that m is a positive integer and m≤p.

2. The method as claimed in claim 1, wherein the solid material is an ore, a concentrate, or a ground material resulting from waste electrical or electronic equipment.

3. The method as claimed in claim 1, wherein the solid material is a material in the form of particles having an average size of less than 20 μm.

4. The method as claimed in claim 1, wherein the first layered double hydroxide is a material in the form of particles having an average size of less than 20 μm.

5. The method as claimed in claim 1, wherein the first aqueous composition has a pH selected in a range of from 3.5 to 12.5.

6. The method as claimed in claim 1, wherein the second aqueous composition has a pH selected in a range of from 7 to 11.

7. The method as claimed in claim 1, wherein the first layered double hydroxide is selected from layered double hydroxides conforming to the formula (I) below:

[M'II1−xM"IIIx(OH)2]x+A1n−x/n.sH2O, in which:
  M'II and M"III represent respectively divalent and trivalent metal cations,
  A1 is an n-valent interlayer anion selected from monovalent and divalent anions and selected from organic and inorganic anions,
  x, s, and n are positive numbers,
  x corresponds to the molar fraction of M"III/(M'II+M"III), and 0<x<1,
  M'II is selected from Ca2+, Mg2+, Mn2+, Fe2+, Co2+, Ni2+, Cu2+, and Zn2+, and
  M"III is selected from Al3+, Mn3+, Fe3+, Co3+, and Cr3+.

8. The method as claimed in claim 1, wherein said method further comprises, between steps ii) and iii), a step ii1) of solid/liquid separation to recover the second layered double hydroxide in the form of a solid.

9. The method as claimed in claim 1, wherein said method further comprises, after step iii), a step iv) of solid/liquid separation to recover the monomeric species of said refractory metal in solution.

10. The method as claimed in claim 9, wherein said method further comprises, after step iv), a step v) of precipitation of the refractory metal in the form of an oxide from the monomeric species of said refractory metal in solution.

11. The method as claimed in claim 1, wherein the mass ratio of the mass of said solid material to the mass of the first layered double hydroxide in step i) is from 1 to 100.

12. The method as claimed in claim 1, wherein the refractory metal is selected from Nb, Ta, and a mixture thereof, and in that step i) comprises the following substeps:

ia) an alkaline treatment of said solid material at a temperature of less than or equal to 550° C., and
ib) the mixing of the treated material from substep ia) with the first layered double hydroxide in the first aqueous composition, said first aqueous composition having a pH selected in a range of from 10 to 12.5.

13. The method as claimed in claim 1, wherein the refractory metal is selected from Nb, Ta, and a mixture thereof, and in that the second aqueous composition further comprises at least one complexing agent.

14. The method as claimed in claim 1, wherein the refractory metal is selected from W, Mo, V, or a mixture of at least two of said metals, and in that the first aqueous composition further comprises a compound capable of forming heteropolyanions selected from phosphates and silicates, the pH of the first aqueous composition being selected in a range of from 3.5 to 10.

15. The method as claimed in claim 1, wherein the concentration of solid matter in the first aqueous composition is from 1 to 400 g/l.

16. The method as claimed in claim 1, wherein in step i), the solid material and the first layered double hydroxide are in the form of an mixture of solid particles dispersed in the first aqueous composition.

17. A method for extracting or purifying a refractory metal selected from Nb, Ta, Mo, W, V, said method implementing a first layered double hydroxide containing interlayer anions $A^{n-}$, n being a positive integer, and
    a mixture of at least two of said refractory metals, from a solid material comprising said refractory metal in an oxidized form, by a method as defined in claim 1.

\* \* \* \* \*